(12) United States Patent
Kanayama (10) Patent No.: US 6,665,045 B2
(45) Date of Patent: Dec. 16, 2003

(54) LIQUID CRYSTAL DISPLAY PANEL AND METHOD OF MANUFACTURING THE SAME

(75) Inventor: Yasufumi Kanayama, Yonago (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 294 days.

(21) Appl. No.: 09/734,960

(22) Filed: Dec. 11, 2000

(65) Prior Publication Data

US 2002/0018149 A1 Feb. 14, 2002

(30) Foreign Application Priority Data

Mar. 28, 2000 (JP) .................................... 2000-089952

(51) Int. Cl.$^7$ ................................................ G06F 1/13
(52) U.S. Cl. ........................................ 349/192; 349/54
(58) Field of Search ................. 349/54, 192; 324/770

(56) References Cited

U.S. PATENT DOCUMENTS

| | | | | |
|---|---|---|---|---|
| 5,546,013 A | * | 8/1996 | Ichioka et al. | 324/770 |
| 5,600,460 A | * | 2/1997 | Yamamoto et al. | 349/54 |
| 5,719,648 A | * | 2/1998 | Yoshii et al. | 349/42 |
| 5,825,439 A | * | 10/1998 | Noriyama | 349/54 |
| 6,111,620 A | * | 8/2000 | Nishiki et al. | 349/54 |
| 6,356,320 B1 | * | 3/2002 | Chung et al. | 349/54 |

FOREIGN PATENT DOCUMENTS

| | | |
|---|---|---|
| EP | 0740184 A2 | 10/1996 |
| JP | 8-304843 | 11/1996 |

* cited by examiner

Primary Examiner—James Dudek
(74) Attorney, Agent, or Firm—Greer, Burns & Crain, Ltd.

(57) ABSTRACT

Disclosed are a liquid crystal display panel having a testing terminal for prober check and a method of manufacturing the same. A black matrix is formed by laminating color filters of a plurality of colors one upon another in a non-display portion of a glass substrate. A mask is disposed in a region opposite to a testing terminal, and ITO is sputtered, thus forming a common electrode. Alternatively, an insulating resin film is formed on a part of the common electrode opposite to the testing terminal.

12 Claims, 10 Drawing Sheets

LIQUID CRYSTAL DISPLAY PANEL AND METHOD OF MANUFACTURING THE SAME

BACKGROUND OF THE INVENTION

1. Field of the Invention

The present invention relates to a liquid crystal display panel having a testing terminal for use in a prober check and a method of manufacturing the same.

2. Description of the Prior Art

Liquid crystal display devices have advantages that they are thin and light, can be driven with a low voltage, and consume little power, so that they have been widely used for various kinds of electronic appliances.

With regard to active matrix liquid crystal display devices in which an active element such as a thin film transistor (hereinafter referred to as TFT) is provided for each pixel, the ones which are excellent so as to be comparable to CRTs (Cathode-Ray Tube) in terms of display quality have been obtained, and used recently for a display in a portable television, a personal computer and the like.

A general TN (Twisted Nematic) type liquid crystal display device has a structure in which liquid crystal is sealed between two transparent substrates. Of two planes (opposite planes) of the transparent substrates opposite to each other, a common electrode (opposite electrode), a color filter, an alignment layer and the like are formed on one plane, and a TFT, a pixel electrode, an alignment layer and the like are formed on the other plane. Moreover, polarizers are adhered to planes reverse to the opposite planes of the transparent substrates, respectively. These two polarizers are disposed so that polarization axes of the polarizers are, for example, perpendicular to each other. According to such arrangement, the two polarizers allow light to transmit therethrough in a state where no voltage is applied, and become a mode to shield the light, that is, a normally white mode, in a state where a voltage is applied. Furthermore, when the polarization axes of the two polarizers are parallel with each other, the two polarizers become a normally black mode. Hereinafter, a substrate on which the TFT, the pixel electrode and the like are formed is referred to as a TFT substrate, and a substrate on which the common electrode, the color filter and the like are formed is referred to as a CF substrate.

The liquid crystal display devices have been recently required to possess far better capability. Particularly, improvement of a viewing angle characteristic and an increase in display quality has been strongly demanded. A vertically aligned (VA) type liquid crystal display device has been taken a hopeful view as the ones satisfying such demands.

Incidentally, in the manufacturing process of a liquid crystal display panel, when a first wiring layer (gate bus line and the like) is formed, short-circuits, abnormalities of resistance values or the like may occur due to excess or shortage of etching in some cases. In the case where such defects occur, since it is useless to execute post-steps, a prober check is performed after forming the first wiring layer to select defective products.

The present inventor thinks that the following problems will occur when high-definition of the liquid crystal display panel is progressed.

In the prober check, a testing pin is made to contact a testing terminal, thus existence of malfunctions of short-circuits and advisability of the resistance values are checked. However, a sharp testing pin has come to be used accompanied with the high-definition of the liquid crystal display panel. Therefore, in some cases, a part of the testing terminal may be peeled off due to the contact thereof to the testing pin to bring a state where a conductive foreign substance is adhered to the testing terminal.

In the case where the TFT substrate is manufactured and joined to the CF substrate while this conductive foreign substance remaining on the testing terminal, the conductive foreign substance and the common electrode on the CF substrate contact to each other to cause short-circuit defects. An alignment layer that is made of polyimide or the like is formed on the common electrode. Since the alignment layer is extremely thin in general, the alignment layer is readily cut when the conductive foreign substance contacts thereto. Thus, the testing terminal and the common electrode are electrically connected to each other through the conductive foreign substance.

SUMMARY OF THE INVENTION

The object of the present invention is to provide a liquid crystal display panel capable of avoiding a short-circuit between a testing terminal and a common electrode even if a conductive foreign substance is adhered to the testing terminal.

A liquid crystal display panel of the present invention comprises: a first substrate having a plurality of pixel electrodes, a plurality of gate bus lines, a plurality of data bus lines, a display portion in which a thin film transistor connected to the pixel electrodes, the gate bus lines and the data bus lines is provided, and the first substrate having a testing terminal which is disposed in a non-display portion around the display portion and connected to the gate bus lines; a second substrate having a common electrode disposed so as to be opposite to the plurality of pixel electrodes; and liquid crystal sealed between the first and second substrates, in which the common electrode is not formed in a region of the second substrate, which is opposite to the testing terminal.

In the present invention, a common electrode is not formed on a region of a second substrate (CF substrate) opposite to a testing terminal of a first substrate. Thus, even if a conductive foreign substance adheres to the testing terminal in a prober check and the conductive foreign substance is not removed in subsequent steps, an electrical short-circuit with the common electrode is prevented.

Furthermore, an insulating film may be formed on the region of the second substrate opposite to the testing terminal. Thus, the conductive foreign substance adhered to the testing terminal is contained by the insulating film, a contact of the foreign substance with the common electrode can be avoided. The insulating film can be easily formed by use of, for example, photoresist. In the VA type liquid crystal display panel, a projection for domain regulation is sometimes formed by use of photoresist. In this case, the insulating film can be simultaneously formed by use of the photoresist for forming the domain regulation projection.

BRIEF DESCRIPTION OF THE DRAWINGS

For a more complete understanding of the present invention and the advantages thereof, reference is now made to the following description taken in conjunction with the accompanying drawings.

DESCRIPTION OF THE PREFERRED EMBODIMENTS

Embodiments of the present invention will be described with reference to the accompanying drawings below.

First Embodiment

Figure 1:
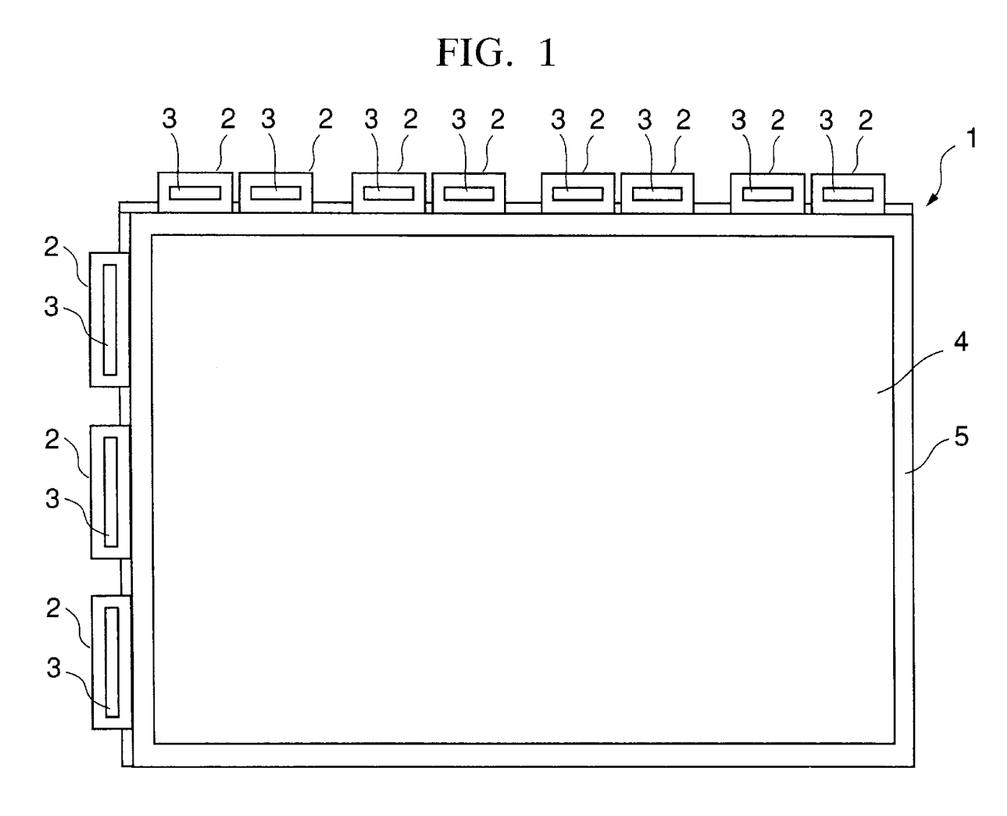
FIG. 1 is a plan view showing a liquid crystal display panel of a first embodiment of the present invention.
Figure 2:
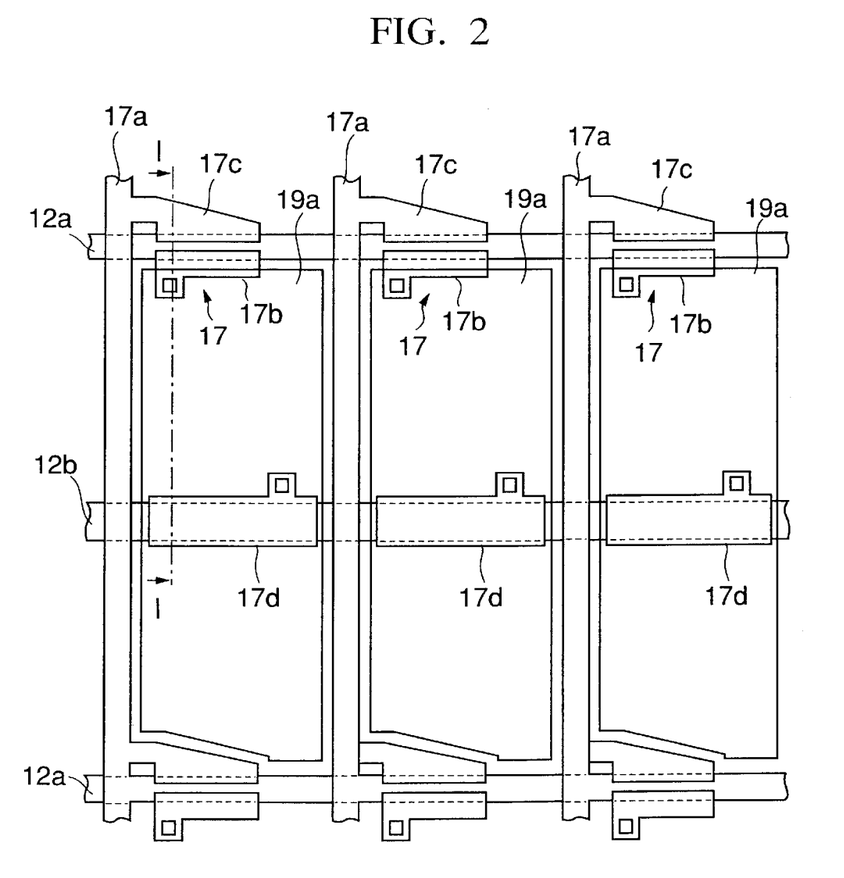
FIG. 2 is a plan view showing a pixel formed in a display portion of the liquid crystal display panel of the first embodiment.
Figure 3:
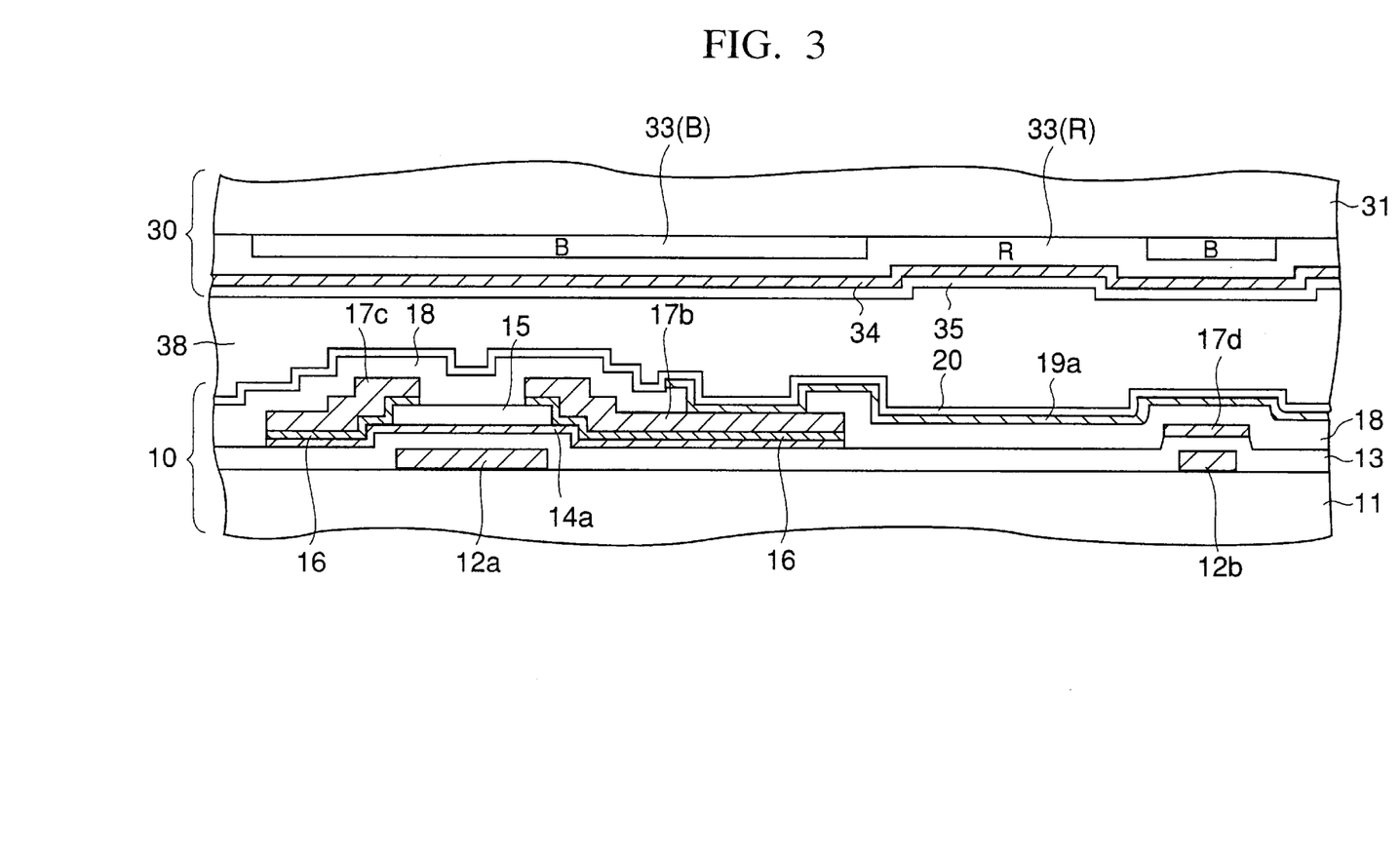
FIG. 3 is a section view of the liquid crystal display panel taken along the line I—I of FIG. 2.
Figure 4A:
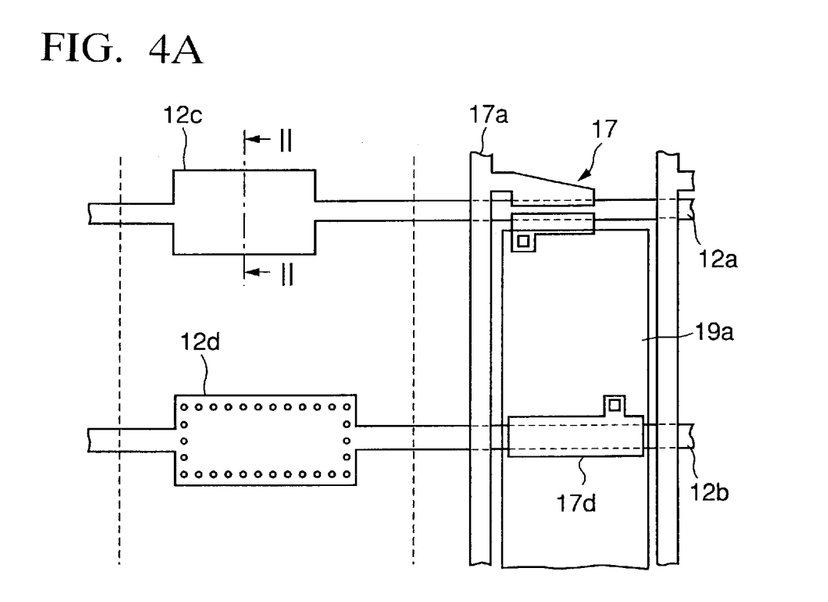
FIG. 4A is a plan view showing a testing terminal disposed in a non-display portion (right end portion of FIG. 1) on a TAB mounting side.
Figure 4B:
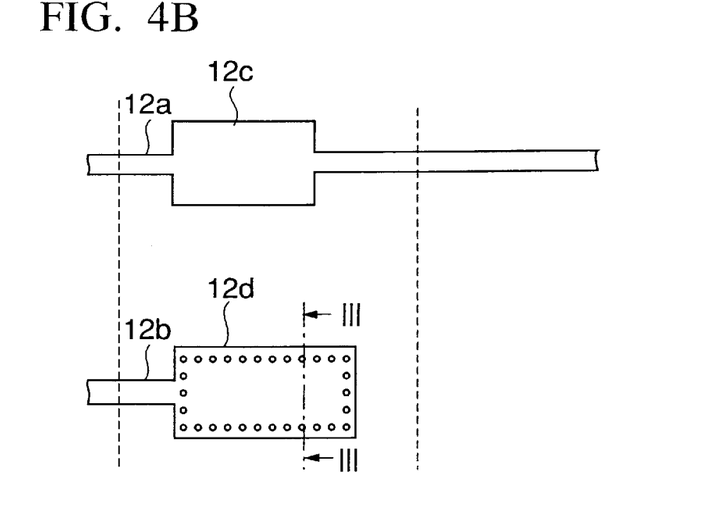
FIG. 4B is a plan view showing a testing terminal disposed on a non-display portion (left end portion of FIG. 1) on a TAB non-mounting side.
Figure 5A:
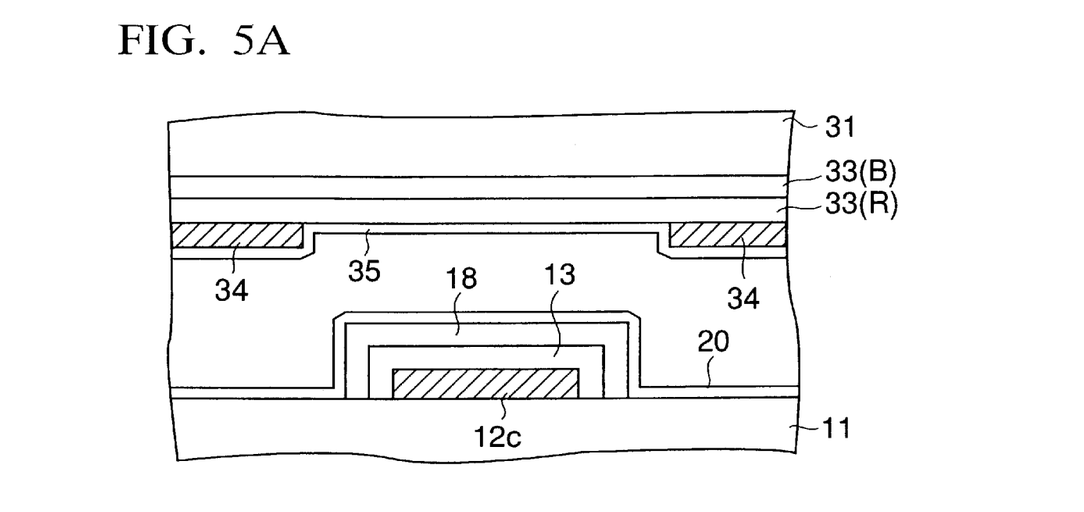
FIG. 5A is a section view of the liquid crystal display panel taken along the line II—II of FIG. 4A.
Figure 5B:
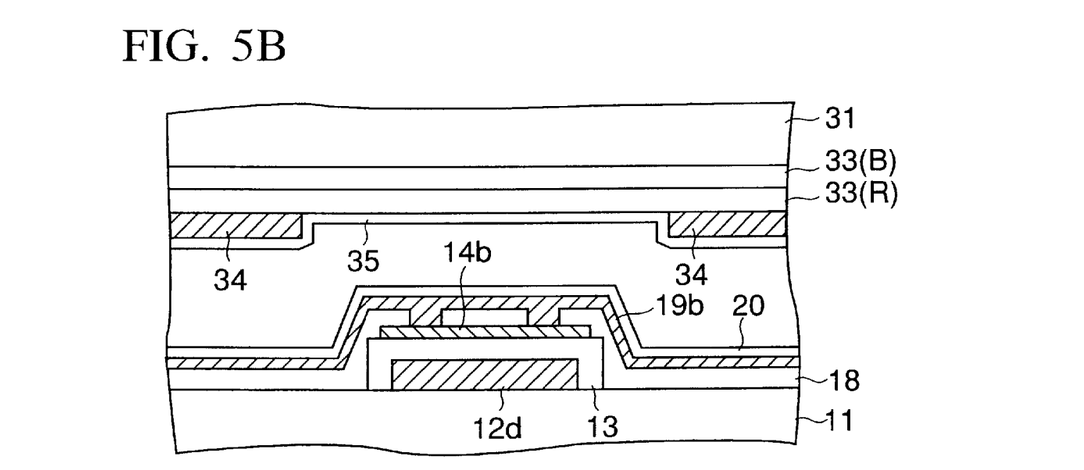
FIG. 5B is a section view of the liquid crystal display panel taken along the line III—III of FIG. 4B.

FIG. 1 is a plan view showing a liquid crystal display panel of a first embodiment of the present invention, and FIG. 2 is a plan view showing a pixel formed in a display portion of the liquid crystal display panel of the first embodiment. FIG. 3 is a section view of the liquid crystal display panel taken along the line I—I of FIG. 2, and FIG. 4A is a plan view showing a testing terminal disposed in a non-display portion (right end side of FIG. 1) on a TAB mounting portion. FIG. 4B is a plan view showing a testing terminal disposed in a non-display portion (left end side of FIG. 1) on a TAB non-mounting portion, and FIG. 5A is a section view of the liquid crystal display panel taken along the line II—II of FIG. 4A. FIG. 5B is a section view of the liquid crystal display panel taken along the line III—III of FIG. 4B.

A plurality of TAB terminals (not shown) are provided along two sides of the liquid crystal display panel 1 which are adjacent to each other. A flexible substrate 2 on which an LSI (large scale integration) 3 is mounted is connected to each TAB terminal. Display data, a timing signal and the like are supplied to the liquid crystal display panel 1 through each flexible substrate 2.

The liquid crystal display panel 1 is constituted of a TFT substrate 10, a CF substrate 30 and liquid crystal 38 sealed between the TFT substrate 10 and the CF substrate 30, as shown in FIG. 3. The liquid crystal display panel 1 can be divided into two regions including a display portion 4 in which a number of pixels are arrayed as shown in FIG. 1 and a non-display portion 5 around the display portion 4. In the display portion 4 of the TFT substrate 10, formed are a plurality of gate bus lines 12a disposed in parallel with each other, a plurality of auxiliary capacitance bus lines 12b disposed between the gate bus lines 12a and a plurality of data bus lines 17a crossing with the gate bus lines 12a, as shown in FIG. 2. A rectangular region surrounded by the gate bus lines 12a and the data bus lines 17a which are adjacent to each other forms each pixel region. A TFT 17, a pixel electrode 19a and an auxiliary capacitance electrode 17d are formed in each pixel region. In this embodiment, a source electrode 17b and drain electrode 17c of the TFT 17 are disposed so as to interpose the gate bus line 12a therebetween, and the auxiliary capacitance electrode 17d is disposed above the auxiliary capacitance bus line 12b.

Incidentally, color filters 33 of red (R), green (G) and blue (B), a common electrode 34 covering these color filters 33 and an alignment layer 35 covering the common electrode 34 are formed on the CF substrate 30. In this embodiment, a black matrix for shielding optically a light shielding portion, that is, a region between the pixels, a TFT formation region and the non-display portion 5, is formed by laminating the color filters 33 of two or more colors (the color filters of red (R) and blue (B) in FIGS. 3 and 5), as shown in FIG. 3 and FIG. 5. Further, the common electrode 34 is not formed in regions on the CF substrate side, which are opposite to the testing terminals 12c and 12d and surrounded by dotted lines in FIGS. 4A and 4B.

A method of manufacturing the liquid crystal display panel of this embodiment will be described with reference to FIGS. 1 through 5 below. First, a method of manufacturing the TFT substrate 10 will be described.

First, chromium (Cr) is sputtered onto a glass substrate 11, and thus a conductive film serving as a first wiring layer is formed to a thickness of about 150 nm. Then, the conductive film is patterned by photolithography, and thus the gate bus lines 12a, the auxiliary capacitance bus lines 12b, the testing terminals 12c and 12d and the TAB terminals (not shown) are formed. As shown in FIGS. 4A and 4B, the testing terminals 12c are formed so as to be connected to the gate bus lines 12a, and the testing terminals 12d are formed so as to be connected to the auxiliary capacitance bus lines 12b. Furthermore, these testing terminals 12c and 12d are formed in the non-display portion 5. Note that though the conductive film serving as the first wiring layer is made of Cr in this embodiment, the conductive film is not limited to the one made of Cr, but the conductive film may be a lamination structure composed of Al (aluminium) and Ti (titanium), or alternatively may be made of Al alloy.

Thereafter, the prober check is performed. Specifically, testing pins are allowed to contact with the testing terminals 12c and 12d, and existence of malfunctions of short-circuits and advisability of the resistance value are checked. Products decided to be defective are removed from production lines.

Next, an insulating film (gate insulating film) 13 is formed on the entire surface of the glass substrate 11, and gate bus lines 12a, auxiliary capacitance bus lines 12b, testing terminals 12c and 12d and TAB terminals are covered with the insulating film 13. The insulating film 13 is formed to a thickness of about 100 to 600 nm by silicon nitride (SiN) or silicon oxide ($SiO_2$).

Subsequently, an amorphous silicon film 14a serving as an active layer of the TFT 17 is selectively formed on the insulating film 13. Simultaneously an amorphous silicon film 14b is formed also on the testing terminals 12d. The amorphous silicon films 14a and 14b are formed to a thickness of, for example, 15 to 50 nm.

Thereafter, a channel protection film (insulating film) 15 is formed on the amorphous silicon film 14a. The channel protection film 15 is formed to a thickness of, for example, about 50 to 200 nm.

Next, an n+ type amorphous silicon film serving as an ohmic contact layer of the TFT 17 is formed to a thickness of about 30 nm. Thereafter, Ti, Al and Ti are sequentially laminated on the amorphous silicon film, and thus a conductive film (second wiring layer) having a three layer structure composed of Ti, Al and Ti is formed. A thickness of a lower Ti layer is set to, for example, 20 nm, a thickness of the Al layer is set to, for example, 75 nm, and a thickness of the upper Ti layer is set to, for example, 20 nm.

Then, the conductive film and the n+ type amorphous silicon film are patterned by photolithography, and thus an ohmic contact layer 16, a data bus line 17a, a source electrode 17b, a drain electrode 17c and an auxiliary capacitance electrode 17d are formed. In this embodiment, though the second wiring layer is formed so as to have the three layer structure composed of the Ti layer, the Al layer and the Ti layer, the second wiring layer may be made of Al, Al alloy or other low resistance metals.

Next, on the entire surface of the glass substrate 11, an insulating film (protection film) 18 made of silicon nitride is formed to a thickness of about 330 nm. Then, contact holes, which reach respectively the source electrode 17b, the auxiliary capacitance electrode 17d and the testing terminal 12d, are formed in the insulating film 18.

Subsequently, a transparent conductive film made of ITO (indium-tin oxide) is formed on the entire surface of the resultant structure on the substrate 11 to a thickness of about 70 nm. The transparent conductive film is patterned by photolithography, and thus a pixel electrode 19a and a cover film 19b located on the testing terminal 12d are formed.

Next, on the entire surface of the resultant structure on the substrate 11, an alignment layer 20 made of polyimide is formed to a thickness of about 100 nm. Thus, the TFT substrate 10 is completed.

The following are descriptions for the method of manufacturing the CF substrate using the drawings.

First, on a glass substrate 31, photoresist in which blue pigment is dispersed is applied to a thickness of about 1.5 $\mu$m, and a blue color filter 33 (B) is formed in a blue pixel portion and a light shielding portion after exposure and developing steps. Thereafter, on the glass substrate 31, photoresist in which red pigment is dispersed is applied to a thickness of about 1.5 $\mu$m, and a red color filter 33(R) is formed in a red pixel portion and the light shielding portion after exposure and developing steps. Subsequently, on the glass substrate 31, photoresist in which green pigment is dispersed is applied to a thickness of 1.5 $\mu$m, and a green color filter 33(G) is formed in a green pixel portion after exposure and developing steps.

Next, a region on the glass substrate 31, which is opposite to the testing terminals 12c and 12d of the TFT substrate 10, is covered with a mask, and ITO is sputtered. Thus, a common electrode 34 having a thickness of about 150 nm is formed. Consequently, the common electrode 34 is formed above the glass substrate 31 as well as in a region other than that opposite to the formation region of the testing terminals 12c and 12d.

Thereafter, on the entire surface of the resultant structure on the substrate 31, polyimide is formed to a thickness of about 100 nm, and thus an alignment layer 35 is formed. Thus, the CF substrate 30 is completed.

After the TFT substrate 10 and the CF substrate 30 are formed in the above-described manner, a seal material is applied to the outside of one display portion of either the TFT substrate 10 or the CF substrate 30, and spherical or cylindrical spacer (not shown) is scattered. Thus, the TFT substrate 10 and the CF substrate 30 are bonded. At this time, in order to inject liquid crystal between the TFT substrate 10 and the CF substrate 30 in post-steps, a region on which the seal material is not applied is previously provided and the region is used as a liquid crystal injection port.

Thereafter, the liquid crystal injection port is dipped in the liquid crystal in a vacuum atmosphere, and the vacuum atmosphere is restored to atmospheric pressure. Thus, the liquid crystal is injected between the TFT substrate 10 and the CF substrate 30. Thereafter, the liquid crystal injection port is sealed by resin. Thus, the liquid crystal display panel of this embodiment is completed. Note that the liquid crystal may be injected between the TFT substrate 10 and the CF substrate 30 by so called a dispenser method in which after the liquid crystal is dropped on one of the TFT substrate 10 and the CF substrate 30, and the other substrate is disposed thereon.

Figure 6A:
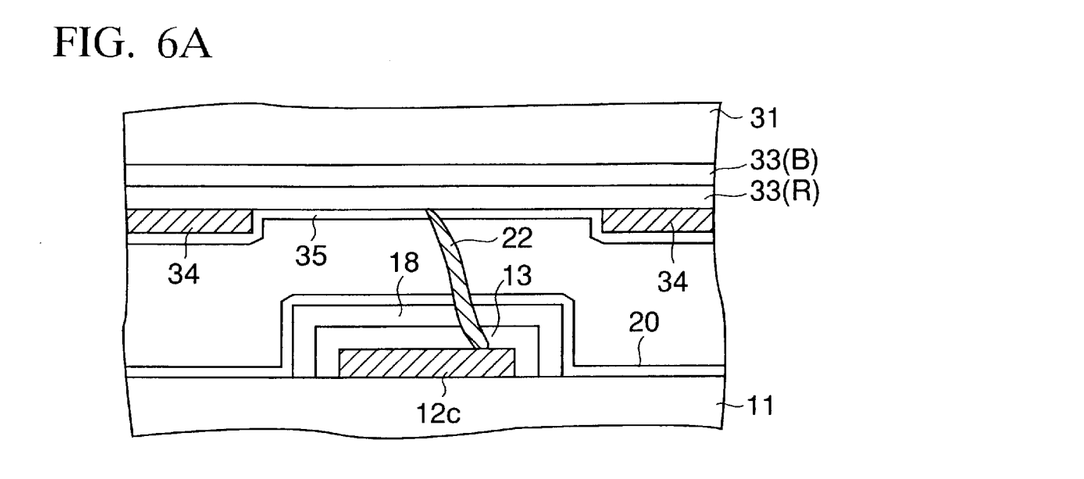
FIGS. 6A and 6B are section views showing states where a conductive foreign substance adheres to the testing terminal.
Figure 6B:
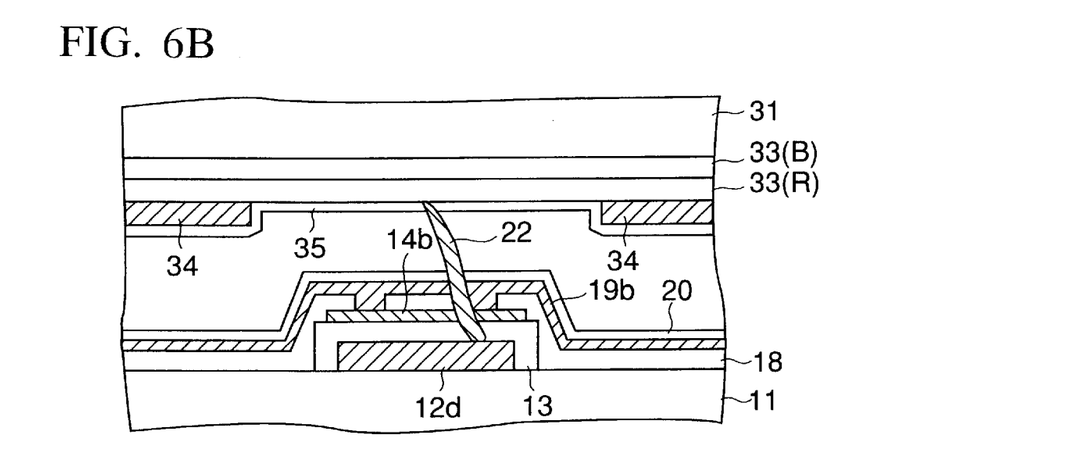

In this embodiment, since the common electrode 34 is not formed in the regions of the CF substrate 30, which correspond to those where the testing terminals 12c and 12d are formed as shown in FIGS. 5A and 5B, occurrence of the malfunction of the short-circuit between the testing terminals 12c and 12d and the common electrode 34 is prevented as shown in FIGS. 6A and 6B even if conductive foreign substance 22 which peeled off from the testing terminals 12c and 12d adheres to the testing terminals 12c and 12d in the prober check. As a result, an effect that a yield in manufacturing the liquid crystal display panel is increased is brought about. Furthermore, since the liquid crystal display panel is designed so that the ITO is not adhered to the regions on the glass substrate 31 by the mask sputtering, which are opposite to the testing terminals 12c and 12d, there is also an advantage that the number of manufacturing steps can be further cut down compared to a method in which the ITO on that region is removed by etching.

In the foregoing embodiment, though the black matrix is formed by laminating the color filters 33 of two or more colors, the black matrix may be made of metals such as Cr (chromium) or black resin. Note that when the black matrix has electrical conductivity, a countermeasure must be devised so that by a method in which insulation resin such as a color filter is formed on the black matrix, the black matrix and the common electrode may not be electrically connected to each other.

Furthermore, in the foregoing embodiment, the adhesion of the ITO to the portion opposite to the testing terminal is prevented by the mask sputtering. However, the ITO film is formed on the entire surface, and the portion of the ITO film opposite to the testing terminal may be removed by etching or other methods.

Second Embodiment

A method of manufacturing a liquid crystal display panel of a second embodiment of the present invention will be described below. This embodiment shows an example of an application of the present invention to a VA type liquid crystal display panel.

Figure 7:
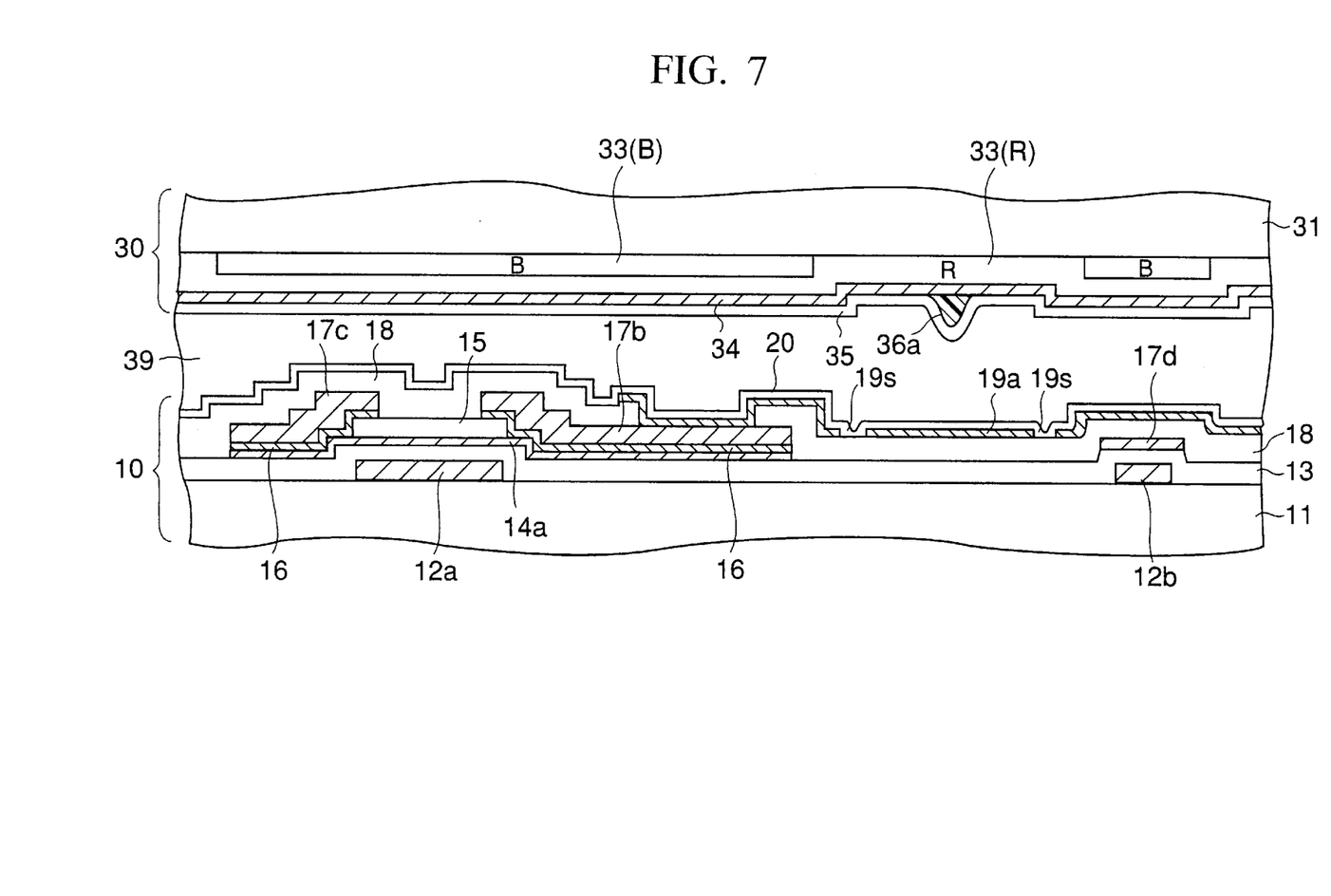
FIG. 7 is a section view in the display portion of a liquid crystal display panel of a second embodiment of the present invention.
Figure 8:
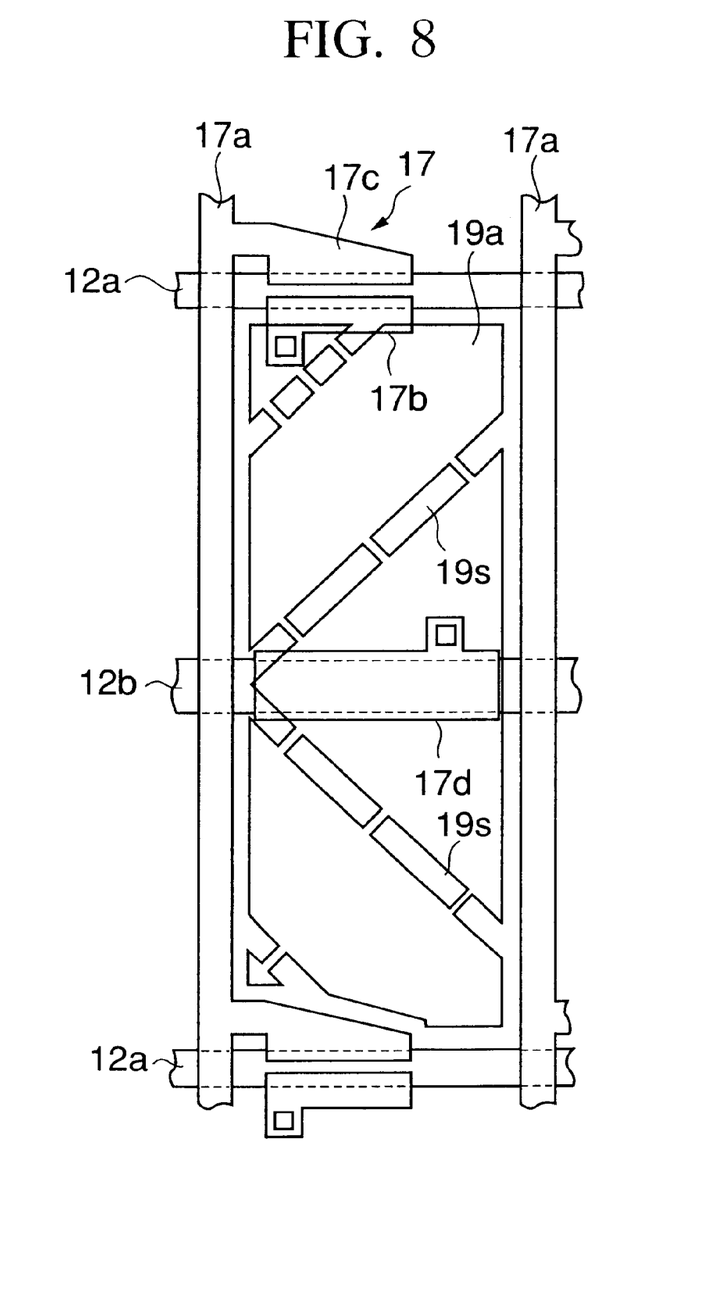
FIG. 8 is a plan view showing a pixel of the liquid crystal display panel of a second embodiment.
Figure 9A:
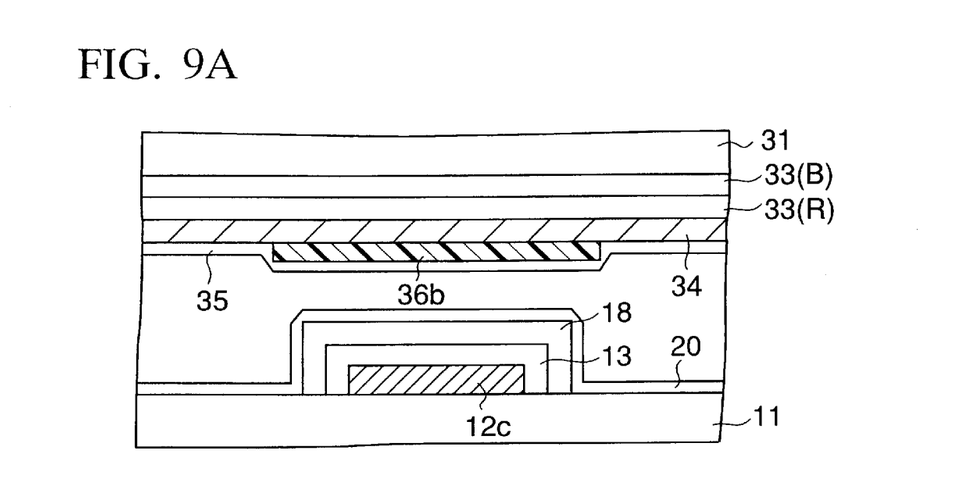
FIG. 9A is a section view of the testing terminal (the testing terminal connected to a gate bus line) which is disposed in the non-display portion on the TAB mounting side.
Figure 9B:
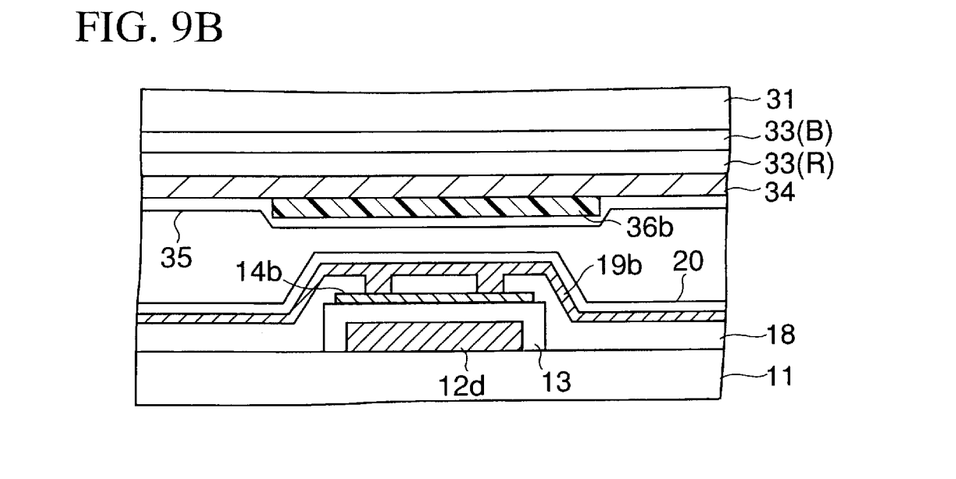
FIG. 9B is a section view of the testing terminal (the testing terminal connected to an auxiliary capacitance bus line) which is disposed in the non-display portion on the TAB non-mounting side.

FIG. 7 is a section view in a display portion of the liquid crystal display panel of the second embodiment, and FIG. 8 is a plan view showing a pixel. FIG. 9A is a section view of a testing terminal (a testing terminal connected to a gate bus line) disposed in a non-display portion on a TAB mounting side, and FIG. 9B is a section view of a testing terminal (a testing terminal connected to an auxiliary capacitance bus line) disposed in a non-display portion on a TAB non-mounting side. Note that in FIG. 7 to FIG. 9, the same constituent components as those of FIG. 2 to FIG. 5 are denoted by the same reference numerals, and detailed descriptions for them are omitted.

In this embodiment, a plurality of slits 19s arranged in an oblique direction are provided in each pixel electrode 19a on the TFT substrate 10. A domain regulation projection 36a extending in parallel with the arrangement direction of the slits 19s on the TFT substrate 10 is formed under the common electrode 34 in the CF substrate 30. Furthermore, VA type liquid crystal 39 is sealed between the TFT substrate 10 and the CF substrate 30.

Liquid crystal molecules of the VA type liquid crystal 39 are aligned in the direction perpendicular to the alignment layer 20 and 34 in a state where a voltage is not applied. Therefore, the alignment directions of the liquid crystal molecules differ from each other on both sides of the projection 36a. When the voltage is applied between the pixel electrode 19a and the common electrode 34, the liquid crystal molecules fall in a direction perpendicular to electric field. At this time, the directions in which the liquid crystal molecules fall differ on both sides of the projection 36a and both sides of each slit 19s. Specifically, two regions in which the liquid crystal molecules fall in different directions exist in one pixel. Thus domain division (multi domain) is achieved, and a viewing angle characteristic is improved to a large degree.

Furthermore, in this embodiment, an insulating resin film 36b is formed in a region of the CF substrate 30 opposite to the prober testing terminals 12c and 12d in the TFT substrate 10. Both of the projection 36a and the resin film 36b are made of photoresist.

A method of manufacturing the liquid crystal display panel of this embodiment will be described below. First, a method of manufacturing the TFT substrate will be described.

Similarly to the first embodiment, after a gate bus line 12a, an auxiliary capacitance bus line 12b, auxiliary capacitance terminals 12c, 12d and TAB terminals and the like are formed on a glass substrate 11, defective products are sorted by performing a prober check.

Next, similarly to the first embodiment, a gate insulating film 13, a TFT 17, a data bus line 17a, an auxiliary capacitance electrode 17d and an insulating film (protection film) 18 and the like are formed on the glass substrate 11. Then, a contact hole reaching a source electrode 17b, a contact hole reaching the auxiliary capacitance electrode 17d, and a contact hole reaching the testing terminal 12d are selectively formed in the insulating film 18. Thereafter, an ITO film is formed on the entire surface of the resultant structure on the glass substrate 11. Then, the ITO film is patterned by photolithography, and thus a pixel electrode 19a and a cover film 19d are formed on the testing terminal 12d. At this time, a plurality of slits 19s arranged in an oblique direction are previously provided in the pixel electrode 19a.

Next, an alignment layer 20 made of polyimide is formed on the entire surface of the resultant structure on the glass substrate 11. Thus, the TFT substrate 10 is completed.

A method of manufacturing the CF substrate will be described below.

Similarly to the first embodiment, a blue color filter 33 (B), a red color filter 33 (R) and a green color filter 33 (G) are formed on the glass substrate 31. At this time, color filters of two or more colors are laminated in a light shielding region, that is, a region between pixels, a TFT formation region and a non-display portion 5, and thus a black matrix is formed.

Next, ITO is sputtered on the entire surface of the resultant structure, and a common electrode 34 is formed. Thereafter, a photoresist film is formed on the common electrode 34, and a projection 36a is formed on the common electrode 34 of a display portion 4 after exposure and developing steps. At the same time, a resin film 36b is formed on the common electrode 34 of a non-display portion 5 opposite to the testing terminals 12c and 12d.

Subsequently, an alignment layer 35 made of polyimide is formed on the entire surface of the resultant structure on the glass substrate 31 so as to cover the surfaces of the common electrode 34, the projection 36a and the resin film 36b. Thus, the CF substrate 30 is completed.

Thereafter, the TFT substrate 10 and the CF substrate 30 are bonded with a sealing material, and VA type liquid crystal 39 is injected between the TFT substrate 10 and the CF substrate 30. Then, a liquid crystal port is sealed by resin or the like. Thus, the liquid crystal display panel of this embodiment is completed.

Figure 10A:
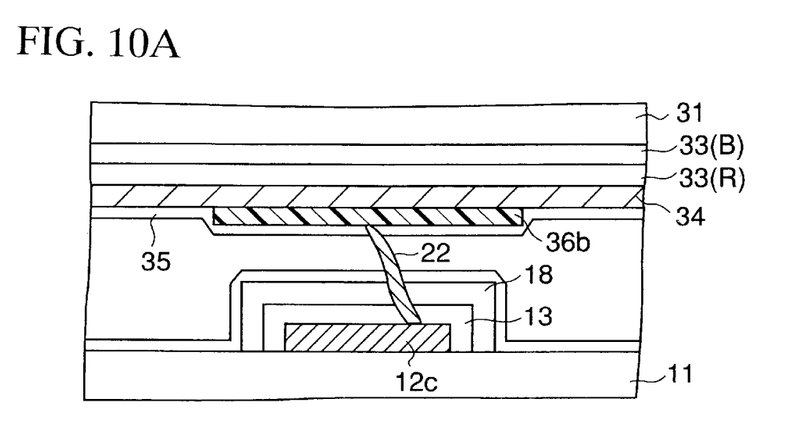
FIGS. 10A and 10B are section views showing states where a conductive foreign substance adheres to the testing terminal.
Figure 10B:
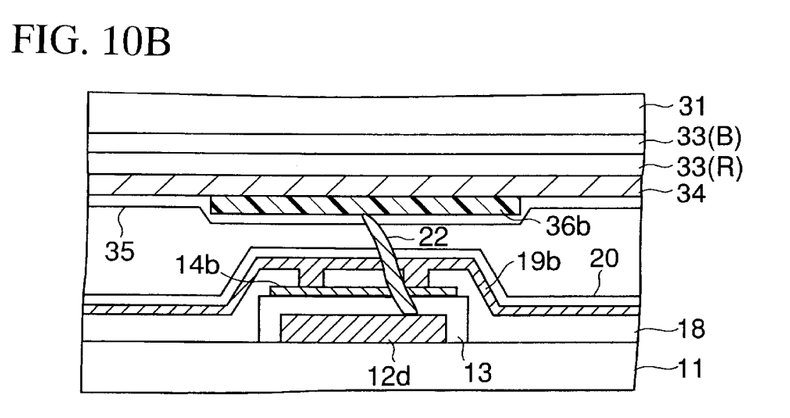

In this embodiment, since the insulating resin film 36b is formed above the testing terminals 12c and 12d, even if a conductive foreign substance 22 adheres to the testing terminals 12c and 12d as shown in FIG. 10, an electrical short-circuit of the testing terminals 12c and 12d and the common electrode 34 is prevented.

In the foregoing second embodiment, though the case where the domain regulation slit 19s is provided in the pixel electrode 19a in the TFT substrate 10 was described, a domain regulation projection may be formed in the pixel electrode 19a as a substitute for the slit 19s.

Moreover, the insulating film (resin film 36b) is made of photoresist in the foregoing second embodiment. However, the insulating film may be made of materials such as $SiO_2$ and $SiN$ other than the photoresist.

Although the preferred embodiments of the present invention have been described in detail, it should be understood that various changes, substitutions and alternations can be made therein without departing from spirit and scope of the inventions as defined by the appended claims.

What is claimed is:

1. A liquid crystal display panel comprising:
   a first substrate having a plurality of pixel electrodes, a plurality of gate bus lines, a plurality of data bus lines, a display portion in which thin film transistors connected to the pixel electrodes, the gate bus lines and the data bus lines are provided, testing terminals which are disposed in a non-display portion around said display portion and connected to said gate bus lines, and TAB terminals which are provided alone sides of said liquid display panel;
   a second substrate having a common electrode disposed so as to be opposite to said plurality of pixel electrodes; and
   liquid crystal sealed between said first and second substrates;
   wherein said common electrode is not formed in a region of said second substrate which is opposite to said testing terminals.

2. A liquid crystal display panel comprising:

a first substrate having a plurality of pixel electrodes, a plurality of gate bus lines, a plurality of data bus lines, a display portion in which thin film transistors connected to the pixel electrodes, the gate bus lines and the data bus lines is provided, testing terminals which are disposed in a non-display portion around said display portion and connected to said gate bus lines, and TAB terminals which are provided along sides of said liquid display panel;

a second substrate having a common electrode disposed so as to be opposite to said plurality of pixel electrodes and said testing terminals, and an insulating film formed in a region opposite to said testing terminals on said common electrode; and liquid crystal sealed between said first and second substrates.

3. The liquid crystal display panel according to claim 2, wherein said insulating film is made of photoresist.

4. The liquid crystal display panel according to claim 2, wherein a domain regulation projection is provided on said common electrode of said second substrate.

5. The liquid crystal display panel according to claim 4, wherein both of said insulating film and said domain regulation projection are made of photoresist.

6. A method of manufacturing a liquid crystal display panel comprising the steps of:

forming gate bus lines in a display portion of a first substrate, forming testing terminals connected to said gate bus lines in a non-display portion and forming TAB terminals along sides of said liquid crystal display panel;

forming data bus lines, pixel electrodes and thin film transistors connected to the data bus lines, the pixel electrodes and said gate bus lines on said first substrate;

forming a common electrode in a region other than that opposite to said testing terminal on a second substrate; and sealing liquid crystal between said first and second substrates.

7. The method of manufacturing a liquid crystal display panel according to claim 6, wherein said common electrode is formed in such a manner that a mask is disposed in a region opposite to said testing terminal and a conductive material is sputtered.

8. A method of manufacturing a liquid crystal display panel comprising the steps of:

forming gate bus lines in a display portion of a first substrate, forming testing terminals connected to said gate bus lines in a non-display portion and forming TAB terminals along sides of said liquid crystal display panel;

forming data bus lines, pixel electrodes and thin film transistors connected to the data bus lines, the pixel electrodes and said gate bus lines on said first substrate;

forming a common electrode on a second substrate;

forming an insulating film on said common electrode in a region opposite to said testing terminals; and sealing liquid crystal between said first and second substrates.

9. The method of manufacturing a liquid crystal display panel according to claim 8, wherein said insulating film is made of photoresist.

10. The method of manufacturing a liquid crystal display panel according to claim 8, wherein a domain regulation slit is formed in said pixel electrode.

11. The method of manufacturing a liquid crystal display panel according to claim 8, comprising the step of forming a domain regulation projection on said common electrode.

12. The method of manufacturing a liquid crystal display panel according to claim 11, wherein said domain regulation projection and said insulating film are simultaneously made of the photoresist.

* * * * *